United States Patent [19]

Kotzur et al.

[11] 4,376,540
[45] Mar. 15, 1983

[54] GAS SEAL FOR SHAFTS WITH A COMPENSATING RING

[75] Inventors: Joachim Kotzur, Oberhausen; Manfred Heinen, Rees, both of Fed. Rep. of Germany

[73] Assignee: M.A.N. Maschinenfabrik Augsburg-Nürnberg Aktiengesellschaft, Fed. Rep. of Germany

[21] Appl. No.: 326,343

[22] Filed: Dec. 1, 1981

[30] Foreign Application Priority Data

Dec. 3, 1980 [DE] Fed. Rep. of Germany ....... 3045475

[51] Int. Cl.³ .......................... F16J 15/36; F16J 15/40
[52] U.S. Cl. .......................................... 277/3; 277/87; 277/88; 277/92; 277/26
[58] Field of Search ....................... 277/3, 26, 81 R, 85, 277/87, 88, 89, 92, 93 R, 93 SD, 96, 96.1, 96.2

[56] References Cited

U.S. PATENT DOCUMENTS

| 1,876,515 | 9/1932 | Emmet | 277/3 X |
|---|---|---|---|
| 2,100,220 | 11/1937 | King | 277/88 |
| 2,859,988 | 11/1958 | Payne | 277/85 |
| 2,884,268 | 4/1959 | Amirault et al. | 277/93 R X |
| 2,937,039 | 5/1960 | Santapa | 277/26 |
| 2,994,547 | 8/1961 | Dolhun et al. | 277/92 X |
| 2,995,390 | 8/1961 | Gardner | 277/26 |
| 3,797,976 | 3/1974 | Moriya et al. | 277/92 X |
| 4,071,253 | 1/1978 | Heinen et al. | 277/3 |

FOREIGN PATENT DOCUMENTS

| 2385013 | 10/1978 | France | 277/3 |
|---|---|---|---|
| 649863 | 2/1951 | United Kingdom | 277/87 |
| 839880 | 6/1960 | United Kingdom | 277/3 |
| 1050298 | 12/1966 | United Kingdom | 277/92 |

*Primary Examiner*—Robert S. Ward, Jr.
*Attorney, Agent, or Firm*—McGlew & Tuttle

[57] ABSTRACT

A gas seal for a rotatable shaft of a housing which comprises, a first rotatable dimensionally stable seal ring connected to the shaft. A diaphragm is connected to the housing which exerts an axial bias on a second rotatable seal ring. The bias of the diaphragm provides a gap space between the rotatable and fixed seal ring which is supplied with a sealing gas. The material of the fixed ring is different from that of the diaphragm. A compensating ring is connected unilaterally to the fixed ring and of a material at least partly the same as the fixed ring. A slide seat is defined between the compensating ring and the fixed ring to permit axial movement of at least a part of the compensating ring. This part is connected in turn to the diaphragm so that stress free transmission of axial thrust is provided between the seal ring and the diaphragm.

9 Claims, 2 Drawing Figures

GAS SEAL FOR SHAFTS WITH A COMPENSATING RING

FIELD AND BACKGROUND OF THE INVENTION

The invention relates to a gas seal for shafts of compressors or other working machines in which operating spaces, in the zone where the shaft passes through a housing, must be hermetically sealed against the ambience and only small amounts of sealing gas can be allowed to penetrate into these operating spaces.

Such shaft seals comprise a sealing ring which is dimensionally stable and rotates with the shaft, and one or two sealing rings which do not rotate with the shaft and are mounted in the housing resiliently and gastightly by means of diaphragms and are axially biased to form radial sealing gaps with the rotating sealing ring. The diaphragms and the non-rotating sealing rings may be made of different materials. The gaps must provide boundaries for a sealing gas cushion to meet operating conditions of the machine. The gaps must be very narrow, i.e., have a width in the micron range.

It will be understood that a distortion, by heat, of such sealing rings may very easily lead to a slight grazing of the parts. This may cause severe damage, since the sealing gas has no lubricating capability. This risk is greater the more the thermal expansion of the materials of the component parts connected to one another, differ from each other. For example, a non-rotating sealing ring of aluminum secured to the housing through a steel bellows to obtain a gastight resilient connection, can hardly be employed at temperatures above 80° since at such a temperature the distortion is large enough to cause a contact with the sealing ring rotation with the shaft and forming the other boudary of the radial seal gap.

SUMMARY OF THE INVENTION

The present invention is directed to a seal of the above mentioned kind in which the critical, non-rotating sealing ring is prevented from warping even if connected to component parts that are quite differently responsive to temperature variations.

Accordingly, an object of the invention is to provide a gas seal for a shaft rotatable in a housing comprising, a dimensionally stable rotating seal ring connected to the shaft for rotation therewith, a diaphragm connected to the housing for exerting an axial bias with respect to the rotating seal ring, a non-rotating seal ring connected to the diaphragm and defining with the rotating seal ring a radial seal gap, the non-rotating seal ring made of a different material from that of the diaphragm, and a compensating ring made of the same material as that of the non-rotating ring connected at one side and at one radial end to the non-rotating seal ring and at an opposite side to the diaphragm, the compensating ring having a sliding surface engaged with a surface of the non-rotating ring spaced from the one radial end, so that a bending stress free transmission of axial thrust to the seal ring is possible.

Alternatively, the compensating ring is made of two materials which are joined to each other by shock plating, with the non-rotating seal ring and the diaphragm being connected by welding, with the interposition of the compensating ring.

Both embodiments of the invention prevent the non-rotating seal ring from being deformed by temperature variations, thus ensure a reliable function of the sealing system. Whether to select the design with metal gluing or with shock plating depends, among other considerations, on the temperature conditions. Tests have shown that the glued connection can safely be used at operating temperatures up to about 100° C., while for higher operating temperatures, the shock weld connection is advisable.

Another object of the invention is to provide such a gas seal which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
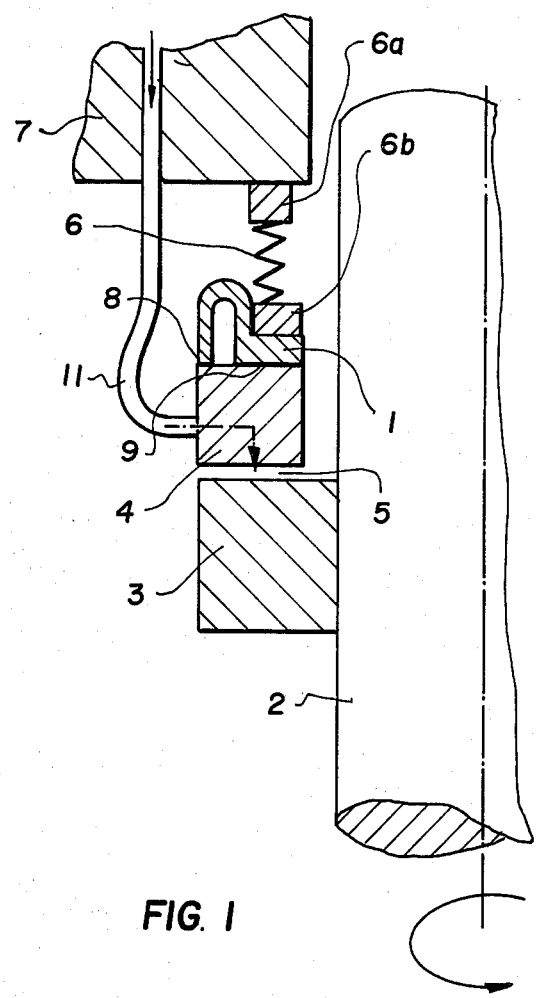
FIG. 1 is a longitudinal partial sectional view of a gas seal for shafts, comprising a compensating ring of a single material.

Referring to the drawings in particular the invention embodied therein comprises a gas seal for a shaft 2 rotatable in a housing 7.

The fixed component parts of a shaft seal shown in FIG. 1 namely a seal ring 4, a compensating ring 1 and a diaphragm designed as a bellows 6 in the example, are connected to to each other by a metal gluing agent.

A seal ring 3 rotating with the shaft 2 forms with the non-rotating ring 4 a seal gap 5 into which sealing gas is supplied through a tube 11 in the direction of the arrow.

Seal ring 4, which may be made of aluminum, for example, is gastightly and sealingly connected to the housing 7 by means of a bellows 6 of steel, for example. Compensating ring 1 serves the purpose of taking up the thermal expansion and is inserted between seal ring 4 and bellows 6. Bellows 6 is connected between ring 1 and housing 7 by its connection parts 6b and 6a respectively.

Compensating ring 1 is made of the same material as fixed seal ring 4, so that both rings expand equally under temperature variations. At the location 8, compensating ring 1 is connected to non-rotating seal ring 4 by a metal bonding agent, and in the area 9, it can slide on seal ring 4 while transmitting an axial thrust. The internal stresses due to the unequal thermal expansions in the area of the glued joint between compensating ring 1 and bellows 6 cannot pass into seal ring 4, because of the U-shape design of the compensating ring 1.

Figure 2:
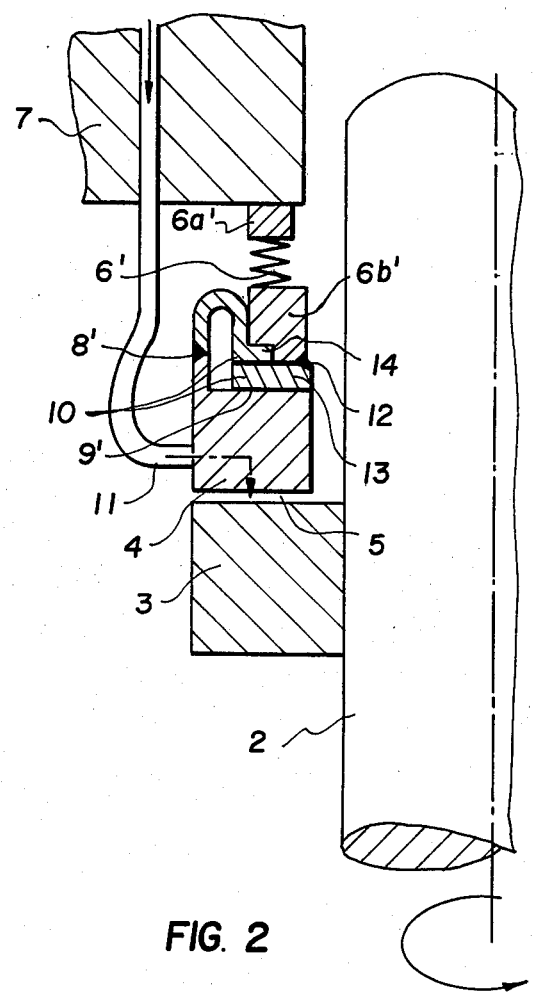
FIG. 2 is a similar view, with a compensating ring of two different materials.

FIG. 2 shows a welded embodiment of the seal where similar parts carry similar numbers with a prime.

In the embodiment compensating ring 10 is made from two different materials 13 and 14, for example aluminum and steel. At 8', the adjacent materials are identical, for example aluminum, and are welded to each other. At 12, the other material of compensating ring 10, steel in the present example, is welded to bellows 6 which also may be of steel. The materials of compensating ring 10 and bellows 6 are thus identical in this zone. The dissimilar materials 13,14 of the compensating ring are gastightly joined to each other by shock welding.

In the embodiment of FIG. 2 again, the compensating ring 10 slides on seal ring 4 in the area 9', while transmitting an axial thrust.

While specific embodiments of the invention have been shown and described in detail to illustrate the application of the principles of the invention, it will be understood that the invention may be embodied otherwise without departing from such principles.

What is claimed is:

1. A gas seal for a shaft rotatable in a housing comprising:
   a dimensionally stable rotating seal ring connected to the shaft for rotation therewith;
   a diaphragm connected to the housing for exerting an axial bias with respect to the rotating seal ring;
   a non-rotating seal ring connected to the diaphragm and defining with the rotating seal ring a radial seal gap, said non-rotating seal ring made of a material different from that of said diaphragm;
   gas supply means connected to said non-rotatable seal ring for supplying gas to the seal gap; and
   a compensating ring made at least in part of the same material as said non-rotating seal ring, connected on one side and at one radial end to said non-rotating seal ring and at an opposite side, and at a place spaced from said one radial end to said diaphragm, said compensating ring having a slide seat surface engaged on a surface of said non-rotating ring spaced from said one radial end.

2. A gas seal according to claim 1, wherein said compensating ring includes a U-shaped portion between said one radial end and said slide seat surface.

3. A gas seal according to claim 2, wherein said diaphragm is connected to said compensating ring on a side of said compensating ring with respect to said U-shaped portion which is opposite from said one radial end.

4. A gas seal according to claim 1, wherein said compensating ring is made of two members of different materials, the first member connected to said non-rotating sealing ring and said radial end being the same as the material of said non-rotating ring and the other member carrying said slide seat surface being of different material.

5. A gas seal according to claim 4, wherein said other member is made of the same material as said diaphragm and is welded to said diaphragm.

6. A gas seal according to claim 4, wherein said two members are connected to each other by shock plating.

7. A gas seal according to claim 4, wherein said first mentioned member is connected to said non-rotating ring at said radial end by welding.

8. A gas seal according to claim 1, wherein said non-rotating seal ring is made of aluminum and said diaphragm is made of steel.

9. A gas seal according to claim 4, wherein said first mentioned member of said compensating ring and said non-rotating seal ring are made of aluminum and said other member of said compensating ring and said diaphragm are made of steel.

* * * * *